Patented Mar. 4, 1924.

1,485,673

UNITED STATES PATENT OFFICE.

MARTIN FREUND, DECEASED, LATE OF FRANKFORT-ON-THE-MAIN, AND EDMUND SPEYER, OF FRANKFORT-ON-THE-MAIN, GERMANY; BY WALTER FREUND, ADMINISTRATOR.

PRODUCT OF REDUCTION OF OXYCODEINON AND PROCESS FOR PREPARING THE SAME.

No Drawing. Original application filed July 15, 1921, Serial No. 485,130. Divided and this application filed September 11, 1922. Serial No. 587,621.

(GRANTED UNDER THE PROVISIONS OF THE ACT OF MARCH 3, 1921, 41 STAT. L., 1313.)

*To all whom it may concern:*

Be it known that MARTIN FREUND, deceased, formerly a resident of Frankfort-on-the-Main, for whom the undersigned WALTER FREUND, residing at Frankfort-on-the-Main, citizen of the German Republic, is acting administrator, and I, EDMUND SPEYER, a resident of Frankfort-on-the-Main, a citizen of the German Republic, have invented certain new and useful Improvements in a Product of Reduction of Oxycodeinon and Processes for Preparing the Same, (for which we have filed applications in Germany, April 14, 1916; Austria, Dec. 9, 1916; Hungary, Dec. 9, 1016; Switzerland, Dec. 7, 1916; Spain, Aug. 18, 1920; Czechoslovak Republic, Feb. 10, 1920; Norway, Dec. 30, 1919; Italy, Feb. 23, 1920; Netherlands, Dec. 31, 1919; Denmark, Dec. 29, 1919; and Sweden, Jan. 20, 1920), of which the following is a clear, full, and exact description.

The subject of this invention is dihydrooxycodeinon, an unknown derivative of oxycodeinon—a product described in the German Letters Patent No. 286,431—and the process of preparing the same.

Oxycodeinon, having the formula $C_{18}H_{19}NO_4$ and a melting point of 273° C., by boiling with a colloidal solution of palladium chloride, is reduced to dihydrooxycodeinon of the formula $C_{18}H_{21}NO_4$. Dihydrooxycodeinon prepared in such manner is actually identical with dihydrooxycodeinon as prepared in accordance with the specification of the patent application Serial Number 485,130, filed July 15, 1921, from which this application is a divisional application.

The identity is shown by the following facts:

Dihydrooxycodeinon prepared in accordance with this application crystallizes from alcohol in long jagged columns melting at 222° C. and yields well crystallized salts. Its hydrochloride $C_{18}H_{20}NO_4.HCl$ crystallizes from water or diluted alcohol in columns melting at 268 to 270° C. Its free base is precipitated from solutions of the salts by ammonia, soda or alkalies; it is unsoluble in excess of alkalies. It combines with methyl iodide to form $C_{18}H_{21}NO_4.CH_3.I$  a compound representing prisms which decompose at 251° C. Its ketone character is shown by the formation of an oxime, the hydrochloride of which:

$$C_{18}H_{22}N_2O_4.HCl$$

is isolated in small sticks decomposing at 275° to 278° C.

The new dihydrooxycodeinon is to be used in medicine and pharmacy.

Example.

Oxycodeinone 31,3 grams (1/10 gram molecule) is suspended in 50 c. c. of water and dissolved by adding glacial acetic acid. To the solution thus obtained add 0.05 grams palladium chloride $(PdCl_2 + 2H_2O)$ dissolved in 10 c. c. of water and make up with water to a total of 200 c. c. Keep shaking this mixture and pass a stream of hydrogen into it until no more is absorbed. When saturation is complete filter and add ammonia to the filtrate, whereupon dihydrocodeinone will be thrown out in corresponding amounts.

Having thus described this invention, what we claim is:

The process of preparing dihydrooxycodeinon, melting at 222° C., which consists in reducing oxycodeinon in an acetic acid solution by molecular hydrogen in the presence of palladium chloride.

In testimony whereof we have hereunto signed our names in the presence of the two subscribing witnesses.

Dr. WALTER FREUND,
*Administrator of Martin Freund, deceased.*
Privatdozent Dr. EDMUND SPEYER.

Witnesses:
Professor Dr. FRITZ MAYER,
Dr. F. HAHN.